N. S. GILBERT.
Fruit Jar.

No. 33,938.  Patented Dec. 17, 1861.

Witnesses:
Charles Alexander
C. U. Alexander

Inventor:
N. S. Gilbert
per T. N. Alexander atty

UNITED STATES PATENT OFFICE.

N. S. GILBERT, OF LOCKPORT, NEW YORK.

IMPROVED PRESERVE-JAR.

Specification forming part of Letters Patent No. 33,938, dated December 17, 1861.

*To all whom it may concern:*

Be it known that I, N. S. GILBERT, of Lockport, county of Niagara, and State of New York, have invented several new and useful inventions and Improvements in the Construction of Jars for Preserving Fruits; and I do hereby declare that the following is a full, clear, and accurate description of the same, reference being had to the accompanying drawings and the letters of reference marked thereon.

The jar itself in form and material resembles those in common use, the difference consisting in the simple device by which the air is excluded and the contents secured from fermentation.

Figure 1:
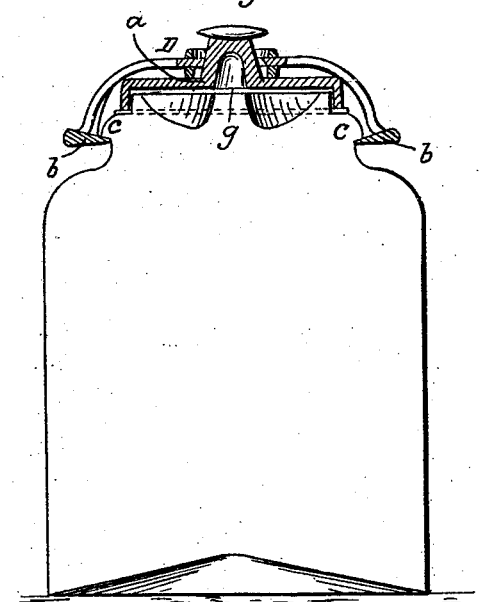

Figure 1 represents a vertical section of the jar. The letters $c\ c$ exhibit an enlargement of the upper part of the neck, the lower side of which may be properly termed an "inverted inclined plane." At the points $e\ e$, Fig. 2, this plane is separated into two divisions, the space between them being sufficient to admit the bail D, with its wedge-like projections $b\ b$, to pass over the mouth of the jar and be in position to perform its appropriate office, which is done by giving it a turn from right to left.

Figure 2:
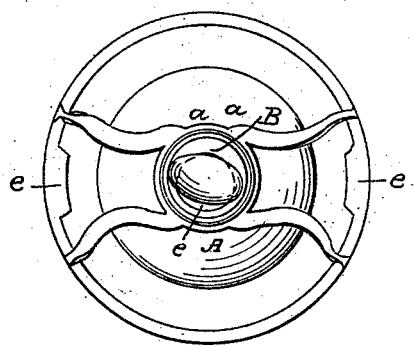

Fig. 2 gives a plan view of the bail D, which is firmly inserted at top into the rim B. This rim, deriving its motion from the bail, presses down the stopper A upon the gum-elastic strip placed around the mouth of the jar, and accomplishes successfully the object intended.

In order to prevent the separation of the bail D from the stopper A, the stopper has a neck surmounted by an elliptical-shaped button, which, being held obliquely, can be made to pass through the circular hole E in the top of the bail, and thus become attached until disunited by a similar oblique motion.

Having thus fully described my invention, what I claim, and desire to secure by Letters Patent, is—

The combination of the bail D, with its wedge-like projections $b\ b$, the stopper $a$, with its elliptical button, and the mouth of the jar, as specified, the whole being arranged and used as and for the purpose set forth.

N. S. GILBERT.

Witnesses:
M. L. BURRELL,
G. W. BURGESS.